Aug. 7, 1934.   W. S. JAMES   1,969,648
FREEWHEELING CLUTCH THROW-OUT DEVICE
Filed Sept. 8, 1931
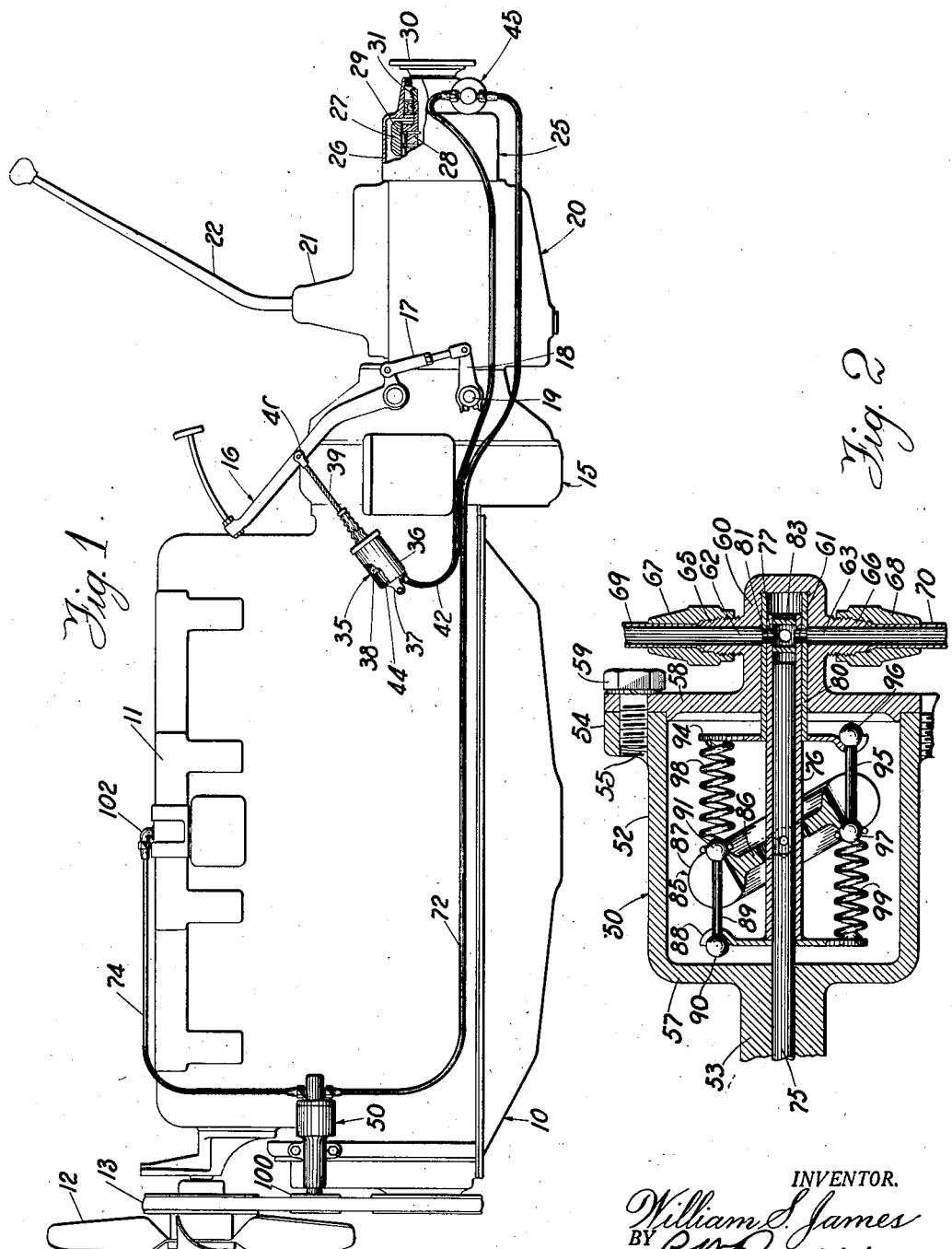
INVENTOR.
William S. James
BY
*P. W. Pomeroy*
ATTORNEYS.

Patented Aug. 7, 1934

1,969,648

UNITED STATES PATENT OFFICE 1,969,648

FREEWHEELING CLUTCH THROW-OUT DEVICE

William S. James, South Bend, Ind., assignor, by mesne assignments, to Free Wheeling Patents Corporation, South Bend, Ind., a corporation of Delaware Application September 8, 1931, Serial No. 561,555

8 Claims. (Cl. 192—85)

This invention relates to an automatic clutch throw-out device, and has for its principal object the provision of a device which will automatically throw-out or disengage the clutch of an automotive vehicle when the vehicle is being brought to a stop and will smoothly and positively let-in or re-engage the clutch when the vehicle is started.

It is a further object to provide a device of the class described that is under the control of both the engine and the drive shaft of the vehicle in order that the device may be used in combination with a free wheeling unit.

It is also an object to provide a device of the class described that is simple in construction, positive in operation, and one that is easy to manufacture and install and will not easily get out of order in use.

In the accompanying drawing, I have shown a suitable mechanical embodiment of the device of the invention. The drawing, however, is to be taken as illustrative only and the scope of the invention is to be limited solely by the scope of the subjoined claims.

In the drawing,

Figure 1 is an elevational view of a vehicle engine, clutch, transmission and free wheeling unit showing the device of the invention applied thereto.

Figure 2 is a longitudinal sectional view of one of the elements forming a part of the device illustrated in Figure 1.

Referring to the drawing in detail, the numeral 10 generally indicates an automobile engine having an intake manifold 11, a fan 12, and a fan belt 13. Mounted directly on the rear portion of the engine is a clutch generally indicated at 15 having a clutch pedal 16 connected by means of a link 17 and an arm 18 to the clutch actuating shaft 19. Mounted on the rear of the clutch 15 is a transmission generally indicated at 20 provided with a transmission cover 21 and a gear shift lever 22, and mounted on the rear of the transmission is a free wheeling unit generally indicated at 25, which comprises an outer casing 26 within which is an outer clutch member 27, an inner clutch member 28, and wedging rollers 29, the outer clutch member 27 being connected to the drive shaft 30. The drive shaft 30 is provided with a worm section 31 to operate the speedometer cable, not shown. As the structure mentioned thus far is entirely conventional and well known, it is believed that a further description is unnecessary for the purpose of this disclosure.

Referring to Figure 1, it will be seen that I have provided in combination with the clutch pedal 16, a vacuum device generally indicated at 35 comprising, a cylinder 36 mounted on the engine block by means of a bracket 37 and having therein a piston 38 connected to a cable 39 which is connected by means of the clevis 40 to the stem of the clutch pedal 16.

A tubular conduit 42 is connected to the cylinder 36 in such a manner that change of fluid pressure in the conduit will serve to actuate the piston 38 to move the clutch pedal 16 by means of the connecting cable 39. The cylinder 36 is also provided with a small leak-port 44 to permit movement of the clutch pedal 16 to engage the clutch when the conduit 42 is obstructed.

Mounted on the bottom of the casing 26 of the free wheeling unit is a device generally indicated at 45, and mounted on the forward part of the engine block is a similar device generally indicated at 50, a longitudinal sectional view of which is shown in Figure 2. As the construction of these two devices is exactly similar, it is believed that a detailed description of only one of them is necessary for the purpose of this disclosure.

Referring to Figure 2, it will be observed that the member generally indicated by 50 comprises the following structure; a cylindrical casing 52, has a bearing 53 formed on one end thereof, the axis of the bearing being coincident with the axis of the cylindrical casing, and has a flange 54 formed upon the other end thereof provided with screw threaded apertures 55. The bearing end of the casing 52 is provided with an end wall 57 and the flanged end is provided with a cover plate 58 secured to the casing 52 by means of stud bolts 59 threaded into the screw threaded apertures 55. The cover plate 58 is in the form of a disk forming a closure for the open end of the casing 52, and is provided centrally thereof with an extension 60 provided with a cylindrical bore 61 and transverse apertures 62 and 63. The apertures 62 and 63 pass through the tubular extensions 65 and 66 on the tubular portion 60, the extensions 65 and 66 being formed as screw threaded terminals for the clamping nuts 67 and 68 by means of which the ends 69 and 70 of the conduits 72 and 74 are secured to the extension 60, the channels of the conduits being extended through the apertures 62 and 63 to the cylindrical bore 61.

Mounted in the bearing 53 and extending into the cylindrical bore is a rotatable shaft 75. Mounted upon this shaft within the cylindrical casing 52 and extending into the cylindrical bore 61 is a sleeve 76 provided in the end thereof extending into the bore 61 with spaced apertures 77, normally in alignment with the transverse apertures 62 and 63. Mounted upon the sleeve 76 and having its inner end spaced from the inner end of the sleeve 76 is a second sleeve 80, also extending into the bore 61 and provided in its end portion with apertures 81, normally in alignment with the transverse apertures 62 and 63. The sleeve 80 extends entirely to the end of the bore 61; the sleeve 76 terminates short of the end of the bore 61 and is provided in its end with closure walls 83.

The shaft 75 and the sleeves 76 and 80 are all of such diametrical dimensions that the shaft 75 has a bearing fit within the sleeve 76, the sleeve 76 has a bearing fit within the sleeve 80, and the sleeve 80 has a bearing fit within the bore 61, whereby the rotatable shaft 75 has a bearing support at either end thereof.

Pivotally mounted on the shaft 75 midway between the inner end of the sleeve 76 and the inner end of the sleeve 80 is a centrifugal member generally indicated at 85 which comprises an inner disk portion 86 surrounded by an annular ring or torus 87.

Mounted upon the shaft 75 and secured to the inner end of the sleeve 76 is an annular disk or washer member 88 connected to the centrifugal member 85 by means of a shaft 89 having balls 90 and 91 upon the opposite ends thereof, a portion of the disk 88 being formed as a socket for the ball 90 and a socket for the ball 91 being formed in the centrifugal member 85.

Secured upon the inner end of the sleeve 80 is an annular disk or washer member 94 secured to the centrifugal member 85 by means of a shaft 95 having balls 96 and 97 upon the opposite ends thereof, a socket being formed in the washer member 94 for the ball 96 and a socket being formed in the centrifugal member 85 for the ball 97.

Between the ball 91 and the washer member 94 is a compression spring 98 and between the ball 97 and the washer member 88 is a compression spring 99. The length of the shafts 89 and 95 and the tension of the springs 98 and 99 is such that when the apertures 77 and 81 are in alignment with each other and with the transverse apertures 62 and 63, the diametrical axis of the centrifugal member 85 is at an angle to the axis of the shaft 75. From this construction it will be seen that when the shaft 75 reaches a sufficient speed of rotation to bring the diametrical axis of the centrifugal member 85 at right angles to the axis of the shaft 75, the apertures 77 and 81 will be out of alignment with each other and with the transverse apertures 62 and 63, so that the passage between the transverse apertures 62 and 63 will be cut off.

Referring again to Figure 1, the shaft 75 of the element 45 has mounted thereon a worm wheel in mesh with the worm 31 of the shaft 30 whereby the shaft of the member 45 is rotated by the drive shaft of the vehicle and the rotation of said shaft is dependent solely upon the speed of the vehicle relative to the ground. The shaft 75 of the element 50 has mounted thereon a pulley 100 which is engaged by the fan belt 13 whereby the rotation of the shaft 75 of the member 50 is dependent upon the speed of the vehicle engine.

It will be noted that the conduit 42 leads from the vacuum cylinder 36 to the element 45. The conduit 72 leads from the element 45 to the element 50 and the conduit 74 leads from the element 50 to a connection 102 leading to the interior of the intake manifold 11 whereby the vacuum of the intake manifold is transmitted through the element 50 and the element 45 to the vacuum cylinder 36 to operate the clutch pedal 16.

The operation of the device is as follows:

Considering that the vehicle has passed through an intersection and is proceeding under power of the engine toward another intersection where a stop is indicated, at the proper interval, the engine throttle is allowed to close, causing the engine to idle. By reason of the free wheeling unit 25, the vehicle will then proceed under its own momentum toward the intersection where it must be stopped. As the intersection is approached, the speed of the vehicle is gradually reduced and at some comparatively low speed, such for instance as five miles per hour although the device is not to be in any way limited to this specific speed, the force of the springs 98 and 99 in the elements 45 and 50 will overcome the centrifugal force of the member 85 and tilt the member relative to the shaft 75. This will open the valve ports through the members 45 and 50, whereby the vacuum in the intake manifold 11 will be exerted through the conduits 74, 72 and 42 to the vacuum cylinder 36 to pull down the piston 35 and depress the clutch pedal 16, thereby disengaging the vehicle clutch. As a high vacuum is maintained in the intake manifold as long as the engine is idling, the clutch will be maintained disengaged as long as the engine is permitted to idle. When it is desired to start the vehicle, the gear shift lever 22 is placed in the proper position and the throttle of the engine is opened, thereby increasing the speed of the engine. This will increase the rotational speed of the shaft 75 of the element 50 and cause the centrifugal forces of the member 85 to overcome the force of the springs 98 and 99, thereby closing the valve ports 68 and 83 and cutting off the intake manifold vacuum from the vacuum cylinder 36. Air will continue to enter the cylinder 36 through the leak-port 44 and as the vacuum has been cut off, the piston 35 will gradually move in the cylinder permitting the clutch pedal 16 to move in a direction to engage the clutch. As the clutch engages, the vehicle starts, and its speed increases until the centrifugal action of the member 85 in the element 45 becomes sufficient to overcome the action of the springs 98 and 99 in the element 45. This will close the valve ports 68 and 83 in the element 45 and also serve to cut off the intake manifold vacuum from the cylinder 36.

If the engine throttle is now allowed to close thereby causing the engine to idle, while the valve ports in the member 50 will open to transmit the manifold vacuum from the conduit 74 to the conduit 72, the valve ports in the element 45 will remain closed as long as the speed of the vehicle is above the speed for which the element 45 is set, so that the vehicle may free wheel under its own momentum without affecting the clutch.

In order for the clutch to be disengaged automatically, the engine speed must be reduced and the vehicle speed must also be reduced to the point where the valve ports in both the members 50 and 45 will open. As long as the engine speed is above the minimum of the vehicle speed, the vacuum of the intake manifold will be ineffective to disengage the vehicle clutch.

It will be seen that this combination greatly reduces the number of clutch actuations, thereby greatly reducing the wear on the clutch, at the same time providing for automatic actuation of the clutch whenever the vehicle is brought to a stop. The centrifugal action of the members 45 and 50 and their connections with the engine speed and the vehicle speed also serves to render the automatic actuation of the clutch exceptionally smooth and positive, giving the vehicle a regular acceleration without the sudden starts or retardations which have been a serious disadvantage in formed devices of this character.

It is also within the scope of this invention that the device illustrated may be operated without the element 45, whereby the automatic clutch action will be dependent entirely on the engine speed. As long as the speed of the engine remains above the given minimum limit, the clutch will be engaged but if the speed of the engine decreases below this minimum limit, the clutch will be disengaged until the speed of the engine is again increased. The action of the clutch in this instance as well as in that previously described is entirely automatic. The principal difference in operation between the forms of the device with the element 45 included and with the element 45 omitted, is that in the first form in shifting from one transmission speed to a higher speed, if the speed of the vehicle becomes greater in low speed than that for which the element 45 is set, manual actuation of the clutch is necessary in order to shift into a higher subsequent speed, but in the second case the clutch will be automatically depressed upon releasing the engine throttle whereby it will be possible to shift through all the transmission speeds without manual actuation of the clutch.

Having now described my invention and the principal objects and advantages thereof so that others skilled in the art may fully understand the same, what I desire to secure by Letters Patent is as follows:

1. In an automotive vehicle having an engine, a clutch and a drive shaft, vacuum actuated means connected with said engine for releasing said clutch, and centrifugal means actuated by said drive shaft and responsive to the speed of the vehicle for controlling said vacuum actuated means, whereby said vacuum actuated means is rendered ineffective to release said clutch before the speed of the vehicle reaches a predetermined minimum.

2. In an automotive vehicle having an engine, a clutch, and a drive shaft, vacuum actuated means for releasing said clutch, centrifugally actuated means responsive to the speed of said engine for controlling said vacuum actuated means, and centrifugally actuated means responsive to the speed of said drive shaft for controlling said vacuum actuated means whereby said vacuum actuated means is ineffective to release said clutch until the speeds of said engine and drive shaft have both reached a predetermined minimum.

3. In an automotive vehicle having an engine, a clutch, and a drive shaft, an intake manifold on said engine, a vacuum cylinder connected with said intake manifold and operative to release said clutch, means responsive to the speed of said engine, and means responsive to the speed of said drive shaft interposed in the connection between said vacuum cylinder and said manifold, whereby said vacuum cylinder is rendered ineffective to release said clutch until the speed of said engine and the speed of said drive shaft have both reached a predetermined minimum.

4. In an automotive vehicle having an engine, a clutch, and a drive shaft, an intake manifold on said engine, a clutch pedal on said clutch, a vacuum device connected with said intake manifold and operative to actuate said clutch pedal, a centrifugal device responsive to the speed of said engine interposed in the connection between said vacuum device and said manifold to cut off said vacuum device from said manifold when the speed of said engine is above a predetermined minimum, and a centrifugal device responsive to the speed of said drive shaft also interposed in the connection between said vacuum device and said manifold to cut off said vacuum device from said manifold when the speed of said drive shaft is above a predetermined minimum.

5. In an automotive vehicle having an engine, a main engine clutch, a drive shaft, and a free-wheeling clutch interposed between said main engine clutch and said drive shaft; vacuum actuated means for releasing said main engine clutch, governor means driven by said engine and responsive to the speed thereof, and governor means driven by said drive shaft and responsive to the speed thereof, said two governor means being operative to restrain said vacuum actuated means from releasing said main engine clutch until the speed of the engine and the speed of the drive shaft have both reached a predetermined minimum.

6. In an automotive vehicle having an engine, a main engine clutch, a drive shaft, and a free-wheeling clutch interposed between said main engine clutch and said drive shaft; vacuum actuated means for releasing said main engine clutch, a pneumatic conduit leading from said engine to said vacuum actuated means, a pair of valves inserted in series in said pneumatic conduit, and a governor device for controlling each of said valves, one of said governor devices being responsive to the speed of said engine and the other of said governor devices being responsive to the speed of said drive shaft, said governor devices acting together to restrain said vacuum actuated means from releasing said clutch until the engine and the drive shaft both reach a predetermined speed.

7. In an automotive vehicle having an engine, a main clutch, and a free wheeling clutch, vacuum actuated means for releasing said main clutch, means responsive to the engine speed for controlling said vacuum actuated means, and means responsive to the speed of the vehicle for controlling said vacuum actuated means, said second and third means being operatively connected so that said vacuum actuated means is rendered ineffective to release said main clutch before both the speed of said engine and the speed of said vehicle reach a predetermined minimum.

8. In an automotive vehicle having an engine, a main clutch, and a free wheeling clutch, vacuum actuated means for releasing said main clutch, means responsive to the speed of the vehicle for controlling said vacuum actuated means and means responsive to the speed of the vehicle for controlling said vacuum actuated means, said vacuum actuated means being ineffective to release said main clutch until both the speed of the vehicle and the engine speed reach a predetermined minimum.

WILLIAM S. JAMES.